Patented Dec. 22, 1953

2,663,741

UNITED STATES PATENT OFFICE 2,663,741

PROPENYL-GUAETHOL AND PROCESS FOR MAKING SAME

Stephen P. Joffre, Cedar Grove, N. J., assignor to Shulton, Inc., Clifton, N. J., a corporation of New Jersey No Drawing. Application November 4, 1950, Serial No. 194,189

1 Claim. (Cl. 260—613)

This application relates to new methods for the production of odoriferous and flavoring substances of high purity and potency and of such low order of toxicity so as to make them particularly industrially and comestibly serviceable for imparting their pleasing and characteristic flavors to foodstuffs.

While the methods and the process steps disclosed herein may perhaps be applied somewhat generally for combined and successive isomerization and demethylation steps, this application is directed specifically to the production of a substituted phenol which has a molecular formula of $C_{11}H_{14}O_2$ and is understood to be 1-ethoxy-2-hydroxy-4-propenyl benzene.

On the basis of this assumed structure, it is deemed apt to apply to this composition the empiric name of "propenyl-guaethol," the name "guaethol" having been applied in the art to the compound having the formulation of "ethoxy-hydroxy-benzene," or a mono-ethyl-ether of pyrocatechin. Accordingly the applicant will use this empiric application for characterizing the specified material produced by the present process with its distinctive and outstanding flavor values. Classification and nomenclature in this field are often confusing and hence applicant has selected a distinctive descriptive name which definitely relates the final product nomenclature-ally to the guaiacol system, and thus to regard the product as the propenyl derivative of guaethol.

Attempts to apply demethylation procedures to substituted phenolic compounds of this character, by means as commonly employed, have been found to be unsatisfactory. Thus, the use of hydrogen bromide, aluminum chloride, pyridine hydrochloride, and sodium ethylate, give very poor yields and effect untoward side reactions of such a nature as to make ultimate isolation of the desired products too uncertain and costly and thus impracticable. It does not appear that any such products have been produced in a quality so as to make them available or suitable for commercial utility as a food flavor. Vanillin has been successfully synthesized from eugenol, but that procedure did not involve the sensitive steps of ethylation and demethylation.

The applicant has now found that, with his new method, through the specified ethers and by his simplified reaction steps, he is able to produce the aforenamed substituted phenol of a quality lending itself to very simple and efficient purification steps and thus producing for the market for the first time a material of high commercial value and of a degree of purity as to render it substantially chemically pure and suitable as a flavoring material for foods as well as for a material in the perfumery art.

I have found in my process that by heating either 1-ethoxy-2-methoxy-4-allyl benzene or 1-ethoxy-2-methoxy-4-propenyl benzene in a suitable solvent, such as ethanol and methanol, with a hydroxide of an alkali metal, preferably potassium hydroxide, at approximately 150 to 190° C. from 4 to 15 hours with continued agitation of the liquid phase in an appropriate autoclave—the time and temperature involved depending upon the choice of solvent and the nature of the metal hydroxide used. The alkali metal salt of 1-ethoxy-2-hydroxy-4-propenyl benzene is produced in good yield and from which the desired product can be directly precipitated in a semi-crude form by simple treatment with ice and mineral acid.

When eugenol ethyl ether is used as the starting material, the method utilizes a single step for effecting both isomerization (allyl to propenyl) and demethylation of the $OCH_3$ group to hydroxyl. This joint action in one single process step with alkali metal hydroxide is both novel and especially advantageous, being directly effective and time-saving. It is also particularly serviceable herein as avoiding prolonged and wasteful manipulation for obtaining a satisfactory degree of isolation of the pure material suitable for industrial use.

It is understood that in this process I do not limit the procedure as to the precise time and temperature necessary to effect the desired conversions since these may be varied within reasonable limits by those familiar with the art to produce the desired result. The values mentioned are those most characteristic of the process. Deviations from the values mentioned are possible but at the eventual sacrifice of yield and/or quality.

I have found that the propenyl guaethol, produced by the above process, to be in the semi-crude state as precipitated, a sweet smelling powder with a light buff to brownish color. It is further purified by recrystallization from alcohol-water solutions to give a substance with a new characteristic sweet and pleasant odor which reminds of a complex of heliotrope, vanilla and violet.

Acute toxicity tests have established that the product produced as described discloses an $LD_{50}$ closely comparable to that of vanillin. But it has also been found, by expert taste evaluation, to have a flavoring potency many fold that of vanillin which, on a use basis, brings the toxicity of my pure product well within the limits of health and safety requirements. All this makes it well adapted for commercial use as a flavor in foods. Likewise its solubility in alcohol and propylene glycol in useful concentrations enhances its value for such use.

I submit the following examples for purposes of illustration, but not by way of any precise limitation as to details and quantities, which may obviously be varied within reasonable limits without departing from the scope and spirit of my invention.

Example I 60 grams of potassium hydroxide is placed in a compact autoclave with 190 cc. of ethyl alcohol and 25 grams of ethyl eugenol ether (1-ethoxy-2-methoxy-4-allyl benzene). The autoclave is heated and the liquid phase continuously agitated for 15 hours at 170° C. The resulting reaction mixture is treated with ice and excess mineral acid which causes the desired compound to precipitate as a light brownish colored material which can readily be collected on a filter, washed with water and air dried. The product so obtained weighed 18 grams of semi-crude product which can readily be recrystallized from alcohol water solutions to give shiny white rectangular plates with the characteristic pleasant and sweet odor of propenyl guaethol (1-ethoxy-2-hydroxy-4-propenyl benzene) and a melting point of 84 to 85° C. The product can be further purified by recrystallizations from alcohol-water solutions to give a constant melting point of 86.5 to 87.5° C.

Example II 25 grams of ethyl isoeugenol ether (1-ethoxy-2-methoxy-4-propenyl benzene); 43 grams of sodium hydroxide and 150 cc. of methanol are placed in a compact autoclave and the liquid phase agitated for 14 hours at 170° C. The reaction is cooled and vented; then treated with ice, filtered and treated with excess mineral acid. A moderately colored product is precipitated by this treatment which is collected on a filter, washed with water and air dried. In this manner 18.5 grams of semi-crude product was obtained. The propenyl guaethol so obtained was recrystallized from isopropyl-alcohol-water solution to give shiny white rectangular plates with a melting point of 84.5 to 85.5° C. and on repeated recrystallizations a melting point of 86 to 87° C. has been attained.

Example III 25 grams of ethyl isoeugenol ether (1-ethoxy-2-methoxy-4-propenyl benzene) is placed in an appropriate autoclave with 60 grams of potassium hydroxide and 190 cc. of ethyl alcohol. The autoclave is heated and the liquid phase continuously agitated for about 14 hours at 170° C. After the reaction has run the required time it is cooled, the residual gas is vented, and the resulting liquid reaction mixture treated with ice, filtered and then treated with excess mineral acid which causes the desired compound to precipitate as a light buff colored material which can readily be collected on a filter, washed with water and air dried. The product so obtained weighed 19 grams of semi-crude propenyl guaethol (1-ethoxy-2-hydroxy-4-propenyl benzene). The product is readily crystallized from alcohol to give shiny flat rectangular plates with a melting point of 84 to 85° C. On further recrystallizations from alcohol-water solutions it is possible to obtain a product which melts at 86.5 to 87.5° C. The product is only very slightly soluble in water but soluble to the extent of 11 grams of substance in 100 cc. of alcohol at 25° C.; 5 grams of substance in 100 cc. of propylene glycol at 25° C. and 6 to 7 grams in peanut oil at 25° C. The 3,5-dinitrobenzoate derived from the above product crystallizes from alcohol as canary yellow needles with a melting point of 156 to 157° C.

Example IV 43 grams of sodium hydroxide is placed in a compact autoclave with 190 cc. of 99% methanol and 25 grams of ethyl eugenol ether (1-ethoxy-2-methoxy-4-allyl benzene). The autoclave is heated and the liquid content agitated for 14 hours at 170° C. The resulting reaction mixture is cooled, treated with ice, filtered and treated with excess mineral acid which causes the desired propenyl guaethol to precipitate. It is collected on a filter, washed with water and air dried. The product so obtained weighs 17.5 grams of semi-crude product which can be readily recrystallized from alcohol-water solutions to give shiny white rectangular plates with a melting point of 84 to 85° C. The substance has the sweet and pleasant character of propenyl guaethol and can be further purified by recrystallizations from alcohol to give a melting point of 86 to 87° C.

Example V 43 grams of sodium hydroxide is placed in suitable autoclave with 190 c. c. of 90% methanol and 25 grams of ethyl eugenol ether (1-ethoxy-2-methoxy-4-allyl benzene). The autoclave is heated and the liquid phase constantly agitated for 14 hours at 170° C. The resulting reaction mixture is cooled, treated with ice, filtered and treated with excess mineral acid which causes the product to precipitate. On washing with water and air drying 14.5 grams of semi-crude propenyl guaethol is obtained. The product can be purified as previously by recrystallization to give a product which melts from 85 to 86° C.

Example VI 25 grams of ethyl eugenol ether (1-ethoxy-2-methoxy-4-allyl benzene) is placed in an appropriate autoclave with 43 grams of sodium hydroxide and 190 c. c. of ethyl alcohol. The autoclave is heated and the liquid phase continuously agitated for about 14 hours at 170° C. The resulting reaction mixture is cooled, treated with ice, filtered and reacted with excess mineral acid. The desired product is thereby precipitated, collected on a filter, washed and air dried—the propenyl guaethol so obtained weighs 14 grams. The product can be recrystallized as in the previous examples to give a substance of a characteristically fine odor and a melting point of 86 to 87° C.

I have produced the desired product with considerable variations in concentration, in choice of solvents and alkali-metal hydroxides, and in times of reaction, but have found the above examples to give consistently good yields of good quality-product suitable for the intended utilities, especially for attainment of a quality for use as a flavor for food.

What is claimed is:

A compound derived from eugenol ethyl ether by isomerization and demethylation and having the probable formula of 1-ethoxy-2-hydroxy-4-propenyl-benzene, occurring, in its pure form, in white shiny rectangular crystals from alcohol, with a melting point of 86.5 to 87.5° C., being readily soluble in alcohol, fixed vegetable oils, and propylene glycol, but slightly soluble in water, and imparting to foods and beverages a taste which is a blend of heliotrope, vanilla and violet.

STEPHEN P. JOFFRE.

References Cited in the file of this patent

UNITED STATES PATENTS

| Number | Name | Date |
| --- | --- | --- |
| 1,704,494 | Boedicker | Mar. 5, 1929 |
| 1,787,036 | Ehrlich | Dec. 30, 1930 |
| 1,835,344 | Schoeller | Dec. 8, 1931 |
| 2,457,074 | Weinkauff | Dec. 21, 1948 |

FOREIGN PATENTS

| Number | Country | Date |
| --- | --- | --- |
| 119,253 | Germany | Jan. 3, 1900 |

OTHER REFERENCES

West, "Conversion of Eugenol and Its Ethers into Propenyl Compounds," Journal Society Chemistry and Industry, vol. 59, No. 12, December, 1940, pages 275–276.